(No Model.)
L. H. DONKEL.
VEHICLE WHEEL.
No. 384,135. Patented June 5, 1888.
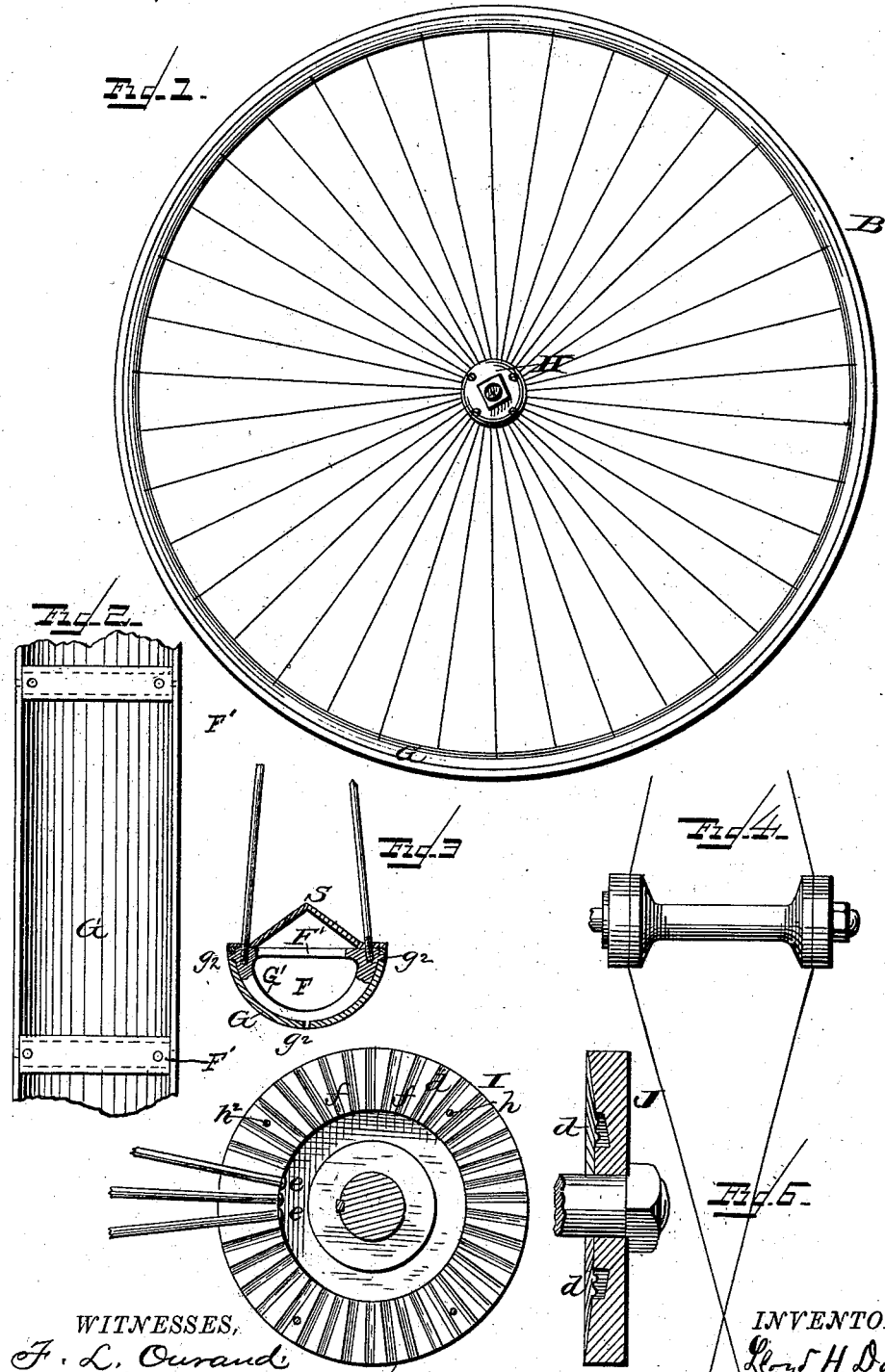
WITNESSES,
F. L. Durand
W. A. Smith
INVENTOR,
Lloyd H. Donkel.
By Fitzgerald & Co. Attorneys.

UNITED STATES PATENT OFFICE.

LLOYD H. DONKEL, OF WINTER PARK, FLORIDA.

VEHICLE-WHEEL.

SPECIFICATION forming part of Letters Patent No. 384,135, dated June 5, 1888.

Application filed February 7, 1888. Serial No. 263,227. (No model.)

*To all whom it may concern:*

Be it known that I, LLOYD H. DONKEL, a citizen of the United States, residing at Winter Park, in the county of Orange and State of Florida, have invented certain new and useful Improvements in Vehicle-Wheels; and I do hereby declare the following to be a full, clear, and exact description of the invention, such as will enable others skilled in the art to which it appertains to make and use the same.

My invention relates to vehicle-wheels especially adapted for use in velocipedes or other vehicles; and it consists in the construction and novel combination of parts, as hereinafter fully described and claimed.

Figure 1 of the drawings is a side elevation of a wheel embodying my improvements. Fig. 2 is a detail plan view of a portion of the rim of the wheel. Fig. 3 is a transverse sectional detail view of the tire of the wheel, showing the angular piece S, which prevents the wheel from throwing sand over the machine. Figs. 4, 5, and 6 are detail views of parts of the wheel, hereinafter referred to.

Referring by letter to the accompanying drawings, the spokes of the wheel B are of spring-steel, and are secured to the hub H by being passed through slots $d$ in the cap I, and having heads or shoulders $e$ at their ends which lie within recesses $f$ in said cap. The caps I J fit over the ends of the hub H and are secured thereto by bolts $h$, which pass through holes $h'$, as shown. The spokes cross each other, running from the ribs F in the tire to the opposite sides of the hub, and the end in the hub has a head or shoulder which rests in a slot, while the end in the rim is screwed therein until the spoke is perfectly tight in the hub.

The spring-steel tire G is convex on the outer or bearing surface, in order to give it an immediate bearing in a wagon-rut, such as is usually found in a sandy country, while on a hard surface there is little or no friction. Furthermore, this shape of tire will find a less frictional bearing on any road than other tires now used, especially the rubber tire, which is made separate from the wheel, and is very expensive, as it does not last long.

Another advantage of this construction of wheel is that when the wheel in revolving strikes an obstruction, instead of springing the spokes and weakening them, the thin spring-tire will spring and push the spokes up in the recesses in the hub, and thus break the shock to the spokes, as well as to the entire machine.

The ribs F, which hold the outer ends of the spokes, consist of the transverse portion F' and the semicircular portion G', adapted to bear transversely against the concave side of the tire, and the said rib F is secured to the tire by means of the integral lug-rivets $g^2$, which pass through suitable openings in the tire.

The tire G of the wheel has an angular piece, S, made of thin spring-steel, fitting entirely around the inside of the rim of the wheel, and held in place by the spokes passing through holes corresponding with holes in the ribs F. The angular piece S prevents loose sand from falling into the concave portion of the rim, and prevents the wheel from throwing sand over the machine.

Having described my invention, what I claim, and desire to secure by Letters Patent of the United States, is—

1. In combination with the tire, the rib F, consisting of the transverse portion and the semicircular portion adapted to engage against the concave side of the tire, and the lug-rivets $g^2$, for securing said rib in place, substantially as specified.

2. In combination with the tire, the rib F, and the spokes engaging in said rib, the angular piece S, of spring-steel, held in place by the spokes passing through holes corresponding with the spoke-holes in the rib F, substantially as specified.

3. In a vehicle-wheel, the combination, with the spring-steel tire and the crossed spokes, of the hub H, having the caps fitted over its ends, and bolts for securing the caps in place, substantially as specified.

In testimony whereof I affix my signature in presence of two witnesses.

LLOYD H. DONKEL.

Witnesses:
HENRY S. CHUBB,
J. S. CAPEN.